United States Patent
Yamahata et al.

(10) Patent No.: US 9,091,904 B2
(45) Date of Patent: Jul. 28, 2015

(54) CAMERA DEVICE WITH ROTARY BASE

(75) Inventors: Toshihiko Yamahata, Fukuoka (JP);
Yasuji Nakamura, Fukuoka (JP);
Yuichiro Mori, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 384 days.

(21) Appl. No.: 13/322,288

(22) PCT Filed: Mar. 2, 2010

(86) PCT No.: PCT/JP2010/001431
§ 371 (c)(1),
(2), (4) Date: Nov. 23, 2011

(87) PCT Pub. No.: WO2010/137211
PCT Pub. Date: Dec. 2, 2010

(65) Prior Publication Data
US 2012/0069223 A1 Mar. 22, 2012

(30) Foreign Application Priority Data

May 28, 2009 (JP) ................................. 2009-129089

(51) Int. Cl.
*G03B 15/00* (2006.01)
*G01S 3/786* (2006.01)
*H04N 5/232* (2006.01)
*H04N 7/18* (2006.01)

(52) U.S. Cl.
CPC ............... *G03B 15/00* (2013.01); *G01S 3/7864* (2013.01); *H04N 5/232* (2013.01); *H04N 5/23248* (2013.01); *H04N 7/188* (2013.01)

(58) Field of Classification Search
None
See application file for complete search history.

(56) References Cited

U.S. PATENT DOCUMENTS

| 5,528,289 | A  | * | 6/1996  | Cortjens et al. ............ 348/211.9 |
| 6,392,693 | B1 | * | 5/2002  | Wakiyama et al. ........... 348/143 |
| 6,720,987 | B2 | * | 4/2004  | Koyanagi et al. ............... 348/36 |
| 6,850,265 | B1 |   | 2/2005  | Strubbe et al. |
| 7,050,093 | B1 |   | 5/2006  | Wada et al. |
| 7,999,842 | B1 | * | 8/2011  | Barrus et al. .................... 348/37 |
| 2003/0142209 | A1 | | 7/2003 | Yamazaki et al. |
| 2003/0202102 | A1 | | 10/2003 | Shiota et al. |
| 2006/0104625 | A1 | | 5/2006 | Oya |

(Continued)

FOREIGN PATENT DOCUMENTS

| CN | 1244666  | 2/2000 |
| CN | 1834768  | 9/2006 |

(Continued)

OTHER PUBLICATIONS

Search report from E.P.O., mail date is Mar. 6, 2012.

*Primary Examiner* — Albert Cutler
(74) *Attorney, Agent, or Firm* — Greenblum & Bernstein P.L.C.

(57) ABSTRACT

A camera device with a rotary base has an automatic panning function of imaging a predetermined zone while reciprocating in a preset panning direction. The camera device includes: an imaging unit configured to image a subject and output a video signal; a rotary base configured to cause the imaging unit to rotate in a panning direction and a tilting direction; a motion and face detecting unit configured to detect the motion or face of the subject based on the video signal output from the imaging unit; and a tilt control instruction creating unit configured to create a tilt control instruction based on the detection result from the motion and face detecting unit and give the tilt control instruction to the rotary base to cause the imaging unit to rotate in the tilting direction.

18 Claims, 6 Drawing Sheets

(56) References Cited

U.S. PATENT DOCUMENTS

| | | |
|---|---|---|
| 2007/0237516 A1 | 10/2007 | Seita |
| 2008/0122958 A1 | 5/2008 | Huseth et al. |
| 2009/0009599 A1 | 1/2009 | Lee |
| 2009/0028386 A1 * | 1/2009 | Michimoto et al. .......... 382/103 |

FOREIGN PATENT DOCUMENTS

| | | |
|---|---|---|
| JP | 7-298247 | 11/1995 |
| JP | 8-139987 | 5/1996 |
| JP | 2003-289532 | 10/2003 |
| JP | 2003-532348 | 10/2003 |
| JP | 2005-124124 | 5/2005 |
| JP | 2005-130007 | 5/2005 |
| JP | 2006-148260 | 6/2006 |
| JP | 2007-267004 | 10/2007 |
| JP | 2008-5204 | 1/2008 |
| JP | 2008-136099 | 6/2008 |
| WO | WO2007/088856 * | 8/2007 |

* cited by examiner

LOWER SPEED, AND
TILT IMAGING UNIT DOWNWARD

FIG. 2(b)

ZOOM UP

: DETECTED

FIG. 2(c)

: NON-DETECTED

FIG. 2(d)

WHEN NOT DETECTED, RETURN SPEED, TILTING
ANGLE, AND ZOOM MAGNIFICATION TO ORIGINAL

CAMERA DEVICE WITH ROTARY BASE

TECHNICAL FIELD

The present invention relates to a camera device with a rotary base which can be suitably used for a monitoring system.

BACKGROUND ART

In general, a monitoring system includes a camera configured to image a subject and output a video signal, a rotary base configured to rotate the camera in a panning direction and a tilting direction, a recorder configured to record the video signal output from the camera, and a monitor configured to display the video signal output from the camera or the video signal recorded in the recorder.

Some monitoring systems according to the background art have an automatic panning function of imaging a predetermined zone while reciprocating in a preset horizontal direction. For example, in a monitoring camera disclosed in Patent Document 1, a platform driving unit of a dome camera includes a sensor configured to measure a rotation angle. In the monitoring camera, an angle of start and end points of an automatic panning and an angle start and end points of a zone not required to be monitored are set as sensor values in a memory in advance, a reciprocating imaging is repeatedly performed at a speed suitable for monitoring between the start and end points of the automatic panning during the automatic panning, and the platform driving unit is driven at the highest speed in the zone not required to be monitored so as to pass through the zone in a short time.

RELATED ART DOCUMENTS

Patent Documents

Patent Document 1: JP-A-2005-130007

SUMMARY OF THE INVENTION

Problem to be Solved by the Invention

However, the above-described automatic panning function can image only a predetermined fixed zone even when the motion or face of a subject is detected in a display screen during the automatic panning, and cannot image a zone centered on the location at which the motion or face of the subject is present.

The invention is made in consideration of the above-described problem. An object of the invention is to provide a camera device with a rotary base which can image a zone centered on a position at which the motion or face of a subject is present even during an automatic panning.

Means for Solving the Problem

According to the invention, there is provided a camera device with a rotary base having an automatic panning function of imaging a predetermined zone while reciprocating in a preset panning direction, the camera device including: an imaging unit configured to image a subject and output a video signal; a rotary base configured to cause the imaging unit to rotate in a panning direction and a tilting direction; a motion and face detecting unit configured to detect the motion or face of the subject based on the video signal output from the imaging unit; and a tilt control instruction creating unit configured to create a tilt control instruction based on the detection result from the motion and face detecting unit and give the tilt control instruction to the rotary base to cause the imaging unit to rotate in the tilting direction.

According to this configuration, since the tilt control instruction is created based on the detection result of the motion or face of the subject and is given to the rotary base to cause the imaging unit to rotate in the tilting direction, it is possible to achieve an automatic panning with a high efficiency which can image a zone centered on the location at which the motion or face of the subject is present.

According to the invention, there is provided a camera device with a rotary base having an automatic panning function of imaging a predetermined zone while reciprocating in a preset panning direction, the camera device including: an imaging unit configured to image a subject and output a video signal; a rotary base configured to cause the imaging unit to rotate in a panning direction and a tilting direction; a motion and face detecting unit configured to detect the motion or face of the subject based on the video signal output from the imaging unit; a tilt control instruction creating unit configured to create a tilt control instruction based on the detection result from the motion and face detecting unit and give the tilt control instruction to the rotary base to cause the imaging unit to rotate in the tilting direction; and a pan control instruction creating unit configured to create a pan control instruction based on the detection result from the motion and face detecting unit and give the pan control instruction to the rotary base to control a speed at which the imaging unit rotates in the panning direction.

According to this configuration, since the tilt control instruction is created based on the detection result of the motion or face of the subject and is given to the rotary base to cause the imaging unit to rotate in the tilting direction, and the pan control instruction is created based on the detection result of the motion or face of the subject and gives the created pan control instruction to the rotary base to control the speed at which the imaging unit rotates in the panning direction, it is possible to image a zone centered on the location at which the motion or face of the subject is present and to clearly image the subject without blurring during the imaging in the panning direction.

According the invention, there is provided a camera device with a rotary base having an automatic panning function of imaging a predetermined zone while reciprocating in a preset panning direction, the camera device including: an imaging unit configured to image a subject through the use of a zoom lens unit and output a video signal; a rotary base configured to cause the imaging unit to rotate in a panning direction and a tilting direction; a motion and face detecting unit configured to detect the motion or face of the subject based on the video signal output from the imaging unit; a tilt control instruction creating unit configured to create a tilt control instruction based on the detection result from the motion and face detecting unit and give the tilt control instruction to the rotary base to cause the imaging unit to rotate in the tilting direction; a pan control instruction creating unit configured to create a pan control instruction based on the detection result from the motion and face detecting unit and give the pan control instruction to the rotary base to control a speed at which the imaging unit rotates in the panning direction; and a zoom control instruction creating unit configured to create a zoom control instruction based on the detection result from the motion and face detecting unit and give the zoom control instruction to the zoom lens unit to magnify the subject.

According to this configuration, since the tilt control instruction is created based on the detection result of the motion or face of the subject and is given to the rotary base to cause the imaging unit to rotate in the tilting direction, the pan control instruction is created based on the detection result of the motion or face of the subject and gives the created pan control instruction to the rotary base to control the speed at which the imaging unit rotates in the panning direction, and the zoom control instruction is created based on the detection result of the motion or face of the subject and is given to the zoom lens to magnify the subject, it is possible to magnify and image a zone centered on the location at which the motion or face of the subject is present and to clearly image the subject without blurring during the imaging in the panning direction.

Advantages of the Invention

According to the invention, since the tilt control instruction is created based on the detection result of the motion or face of the subject and is given to the rotary base to cause the imaging unit to rotate in the tilting direction, it is possible to achieve an automatic panning with a high efficiency which can image a zone centered on the location at which the motion or face of the subject is present. According to the invention, since the pan control instruction is created based on the detection result of the motion or face of the subject and gives the created pan control instruction to the rotary base to control the speed at which the imaging unit rotates in the panning direction, it is possible to clearly image the subject without blurring during the imaging in the panning direction. According to the invention, since the zoom control instruction is created based on the detection result of the motion or face of the subject and is given to the zoom lens to magnify the subject, it is possible to magnify and image a zone centered on the location at which the motion or face of the subject is present.

BRIEF DESCRIPTION OF THE DRAWINGS

FIGS. 2(a) to 2(e) are diagrams illustrating as images the operations when a video processing unit of the camera device with a rotary base according to the first embodiment detects a person's face.

MODE FOR CARRYING OUT THE INVENTION

Hereinafter, exemplary embodiments of the invention will be described in detail with reference to the accompanying drawings.

First Embodiment

Figure 1:
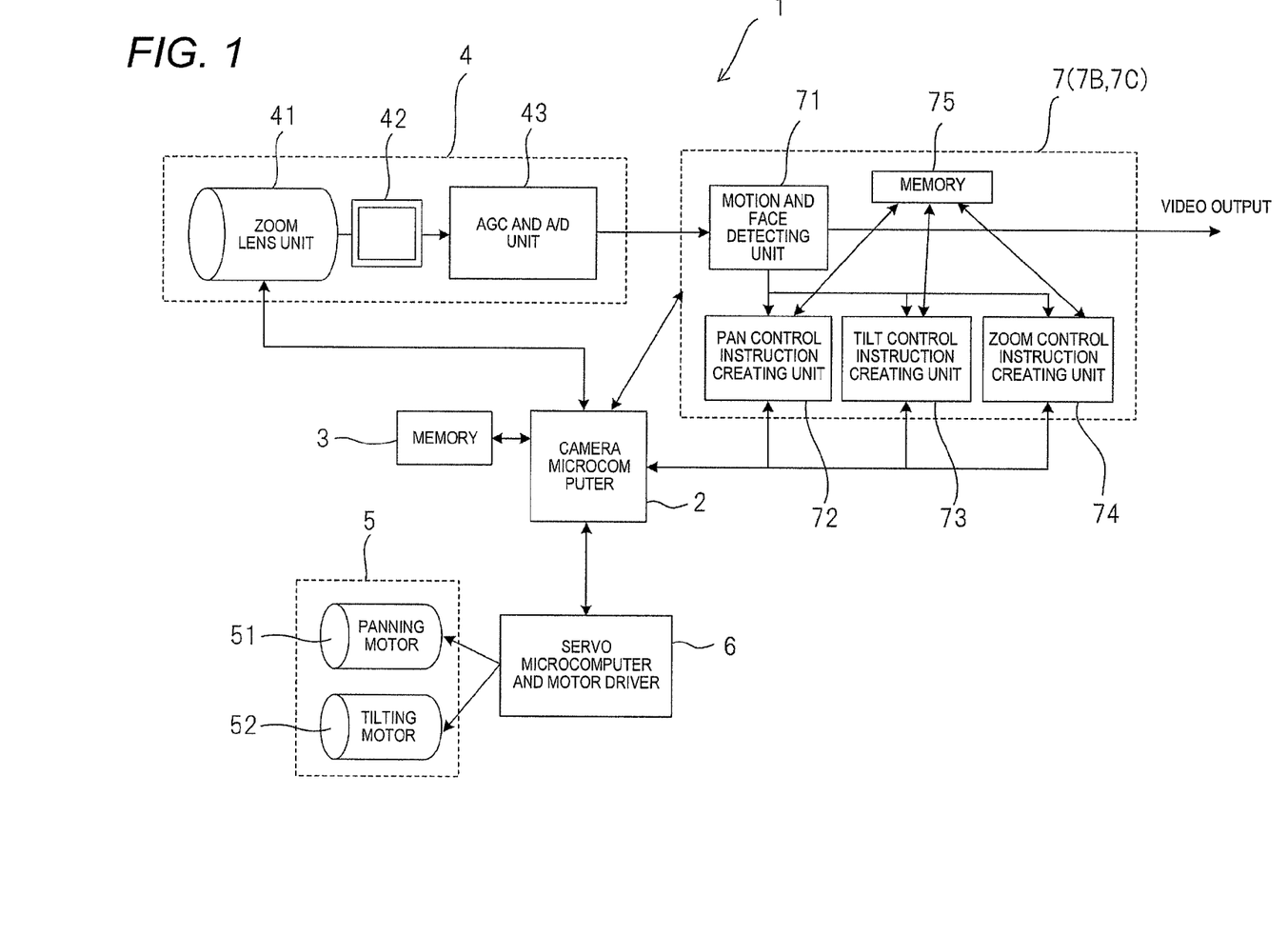
FIG. 1 is a block diagram schematically illustrating the configuration of a camera device with a rotary base according to a first embodiment of the invention.
Figures 2A, 2E:
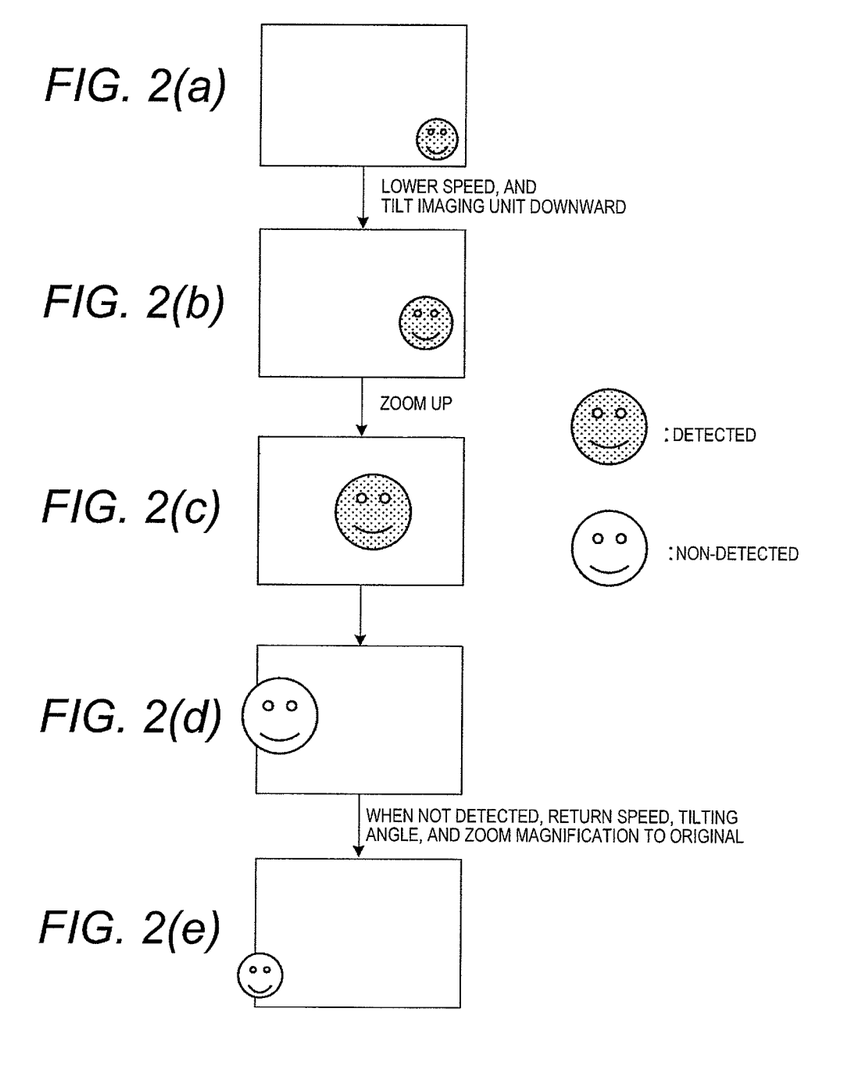

FIG. 1 is a block diagram schematically illustrating the configuration of a camera device with a rotary base according to a first embodiment of the invention. In the drawing, the camera device 1 with a rotary base according to this embodiment includes a camera microcomputer 2 configured to control the units of the camera device 1 with a rotary base, a nonvolatile memory 3 such as a flash ROM (Read Only Memory) configured to store programs for controlling the camera microcomputer 2, an imaging unit 4 serving as imaging means and configured to image a subject, a rotary base 5 configured to cause the imaging unit 4 to rotate in a panning direction and a tilting direction, a servo microcomputer and motor driver 6 configured to control the rotary base 5 in response to PT (PAN, TILT) control instructions from the camera microcomputer 2, and a video processing unit 7 configured to detect the motion and face based on a video signal from the imaging unit 4 and create PTZ (PAN, TILT, ZOOM) control instructions.

The imaging unit 4 includes a zoom lens unit 41, an imaging device 42 such as a CCD (Charge Coupled Device) or a CMOS (Complementary Metal Oxide Semiconductor) configured to convert a video obtained through the use of the zoom lens unit 41 into an electrical signal, and an AGC and A/D unit 43 configured to control the level of the video signal to be constant and digitalizing the video signal. The video processing unit 7 includes: a motion and face detecting unit 71 configured to detect a motion and a face based on a video signal from the imaging unit 4; a pan control instruction creating unit 72, a tilt control instruction creating unit 73, and a zoom control instruction creating unit 74 which are configured to create the PTZ control instructions based on the detection result and PTZ position information supplied from the camera microcomputer 2; and a volatile memory 75 such as a RAM (Random Access Memory) configured to store the PTZ control instructions.

The camera microcomputer 2 gives the PT control instructions to the servo microcomputer and motor driver 6 to control a panning motor 51 and a tilting motor 52 of the rotary base 5 in response to the PTZ control instructions input from the video processing unit 7 and gives the Z control instruction for zoom to the imaging unit 4 to control the zoom lens unit 41. The camera microcomputer 2 controls the server microcomputer and motor driver 6 and controls the zoom lens unit 41 of the imaging unit 4 to detect an origin position when it is powered on. During the operation, the camera microcomputer 2 always creates the PTZ position information from the position information of panning and tilting of the imaging unit 4 input from the servo microcomputer and motor driver 6 and the zoom information input from the zoom lens unit 41 of the imaging unit 4 and inputs the created PTZ position information to the video processing unit 7.

The operation of the camera device 1 with a rotary base according to this embodiment will be described. FIGS. 2(a) to 2(e) are diagrams illustrating as images the operation of the video processing unit 7 when a face is detected. In the drawings, the automatic panning is performed while detecting the face or motion. For example, when a face is detected, the automatic panning speed is lowered (FIG. 2(a)) and the tilting is performed so that the face is located at the center of the display screen (FIG. 2(b)). Then, the zooming is performed so that the face occupies a predetermined size of the display screen (FIG. 2(c)). Thereafter, the automatic panning is continuously performed while lowering the speed, and the speed, the tilting angle, and the zoom magnification are returned to the original values when the face is not detected from the display screen (FIGS. 2(d) and 2(e)).

Figure 3:
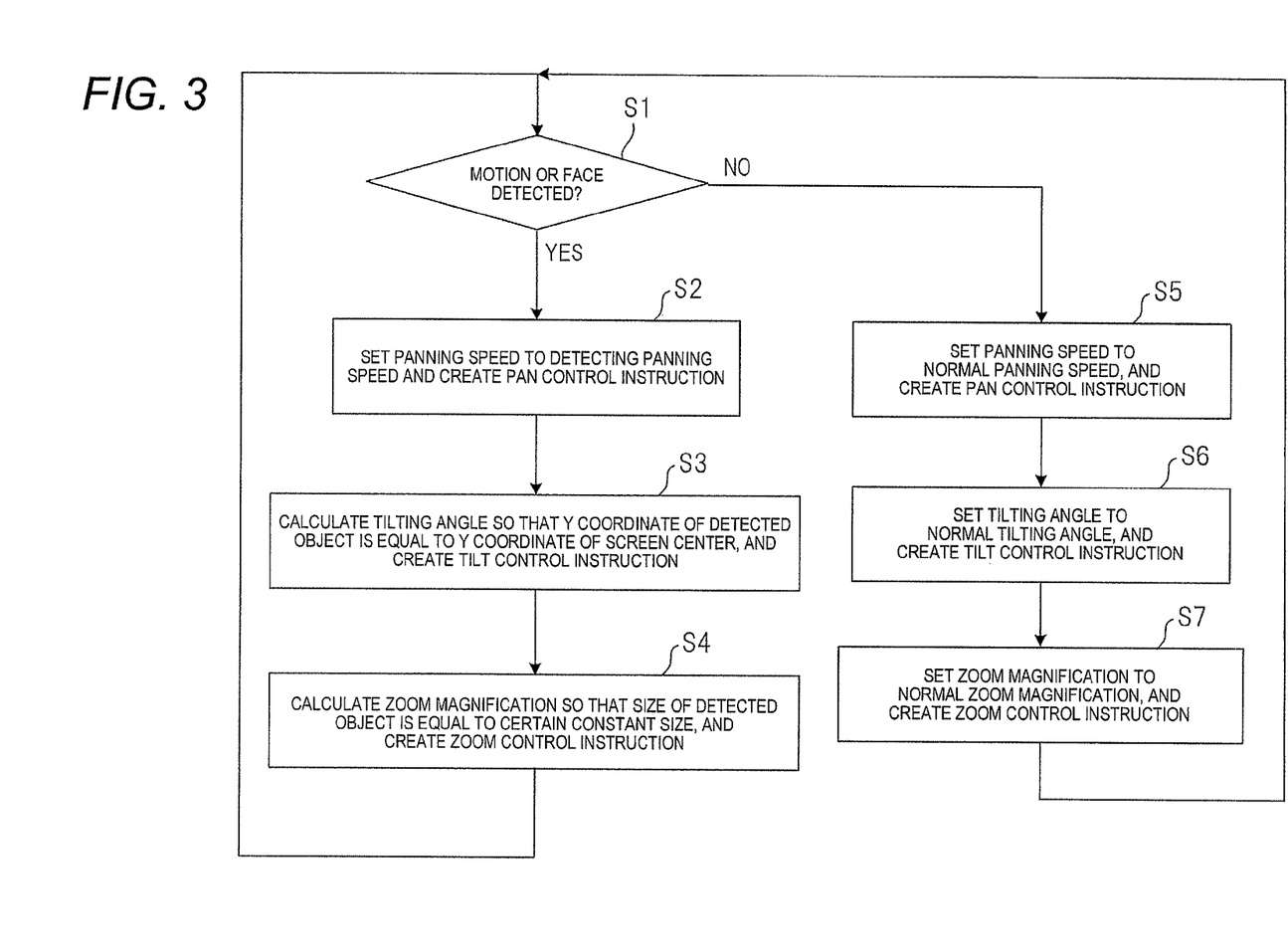
FIG. 3 is a flow diagram illustrating the operation of the video processing unit of the camera device with a rotary base according to the first embodiment.

FIG. 3 is a flow diagram illustrating the operation of the video processing unit 7 creating the PTZ control instructions. In the drawing, it is first determined whether the motion and face detecting unit 71 detects the motion or face of an object (subject) based on a video signal from the imaging unit 4 (step S1). The process of step S2 is performed when it is determined that the motion or face of an object is detected, and the process of step S5 is performed when it is determined that the motion or face of an object is not detected.

When the motion or face of an object is detected and thus the process of step S2 is performed, the pan control instruction creating unit 72 sets the panning speed to a detecting panning speed and creates and outputs a pan control instruction (step S2). Here, the normal panning speed and the detecting panning speed satisfy the following relationship: normal panning speed>detecting panning speed.

After the pan control instruction is created and output, the tilt control instruction creating unit 73 calculates an operating tilting angle so that the Y coordinate of the detected object becomes the Y coordinate of the center of the display screen, and creates and outputs a tilt control instruction based on the calculation result (step S3). Here, the normal tilting angle does not depend on the panning angle but is constant (for example, 45 degrees downward).

After the tilt control instruction is created and output, the zoom control instruction creating unit 74 calculates an operating zoom magnification so that the size of the detected object on the display screen becomes a certain constant size (for example, a quarter of the screen size), and creates and outputs a zoom control instruction based on the calculation result (step S4). At this time, the detected object is not fully seen from the display screen due to the zoom. Here, the normal zoom magnification does not depend on the panning angle but is constant (for example, an equal magnification).

On the other hand, when the motion or face of an object is not detected and thus the process of step S5 is performed, the pan control instruction creating unit 72 sets the panning speed to the normal panning speed and creates and outputs a pan control instruction (step S5). After the pan control instruction is created and output, the tilt control instruction creating unit 73 sets the tilting angle to the normal tilting angle and creates and outputs a tilt control instruction (step S6). After the tilt control instruction is created and output, the zoom control instruction creating unit 74 sets the zoom magnification to the normal zoom magnification and creates and outputs a zoom control instruction (step S7).

In this way, in the camera device 1 with a rotary base according to this embodiment, since such a tilting angle that the Y coordinate of an object is equal to the Y coordinate of the screen center is calculated based on the detection result of the motion or face of the object, a tilt control instruction is created and is given to the rotary base 5 to cause the imaging unit 4 to rotate in the tilting direction, the panning speed is set to the detecting panning speed based on the detection result of the motion or face of the object, a pan control instruction is created and is given to the rotary base 5 to control the speed at which the imaging unit 4 rotates in the panning direction, such a zoom magnification that the size of the object becomes a certain constant size is calculated based on the detection result of the motion or face of the object, and a zoom control instruction is created and is given to the zoom lens unit 41 to magnify the subject, it is possible to achieve an automatic panning function with a high efficiency which can image a zone centered on the location at which the motion or face of the subject is present. It is also possible to clearly image the subject without blurring during the imaging in the panning direction.

Second Embodiment

In the first embodiment, as soon as the motion or face is detected, the panning speed is set to the set speed, the tilting angle is set to the set angle, and the zoom magnification is set to the set magnification. However, in a second embodiment of the invention, when the motion or face is detected, gradually, the panning speed is set to the set speed, the tilting angle is set to the set angle, and the zoom magnification is set to the set magnification. The configuration of this embodiment is the same as the first embodiment and FIG. 1 is incorporated herein by reference. However, a partial function of the video processing unit is different and thus the video processing unit is referenced by "7B".

Figure 4:
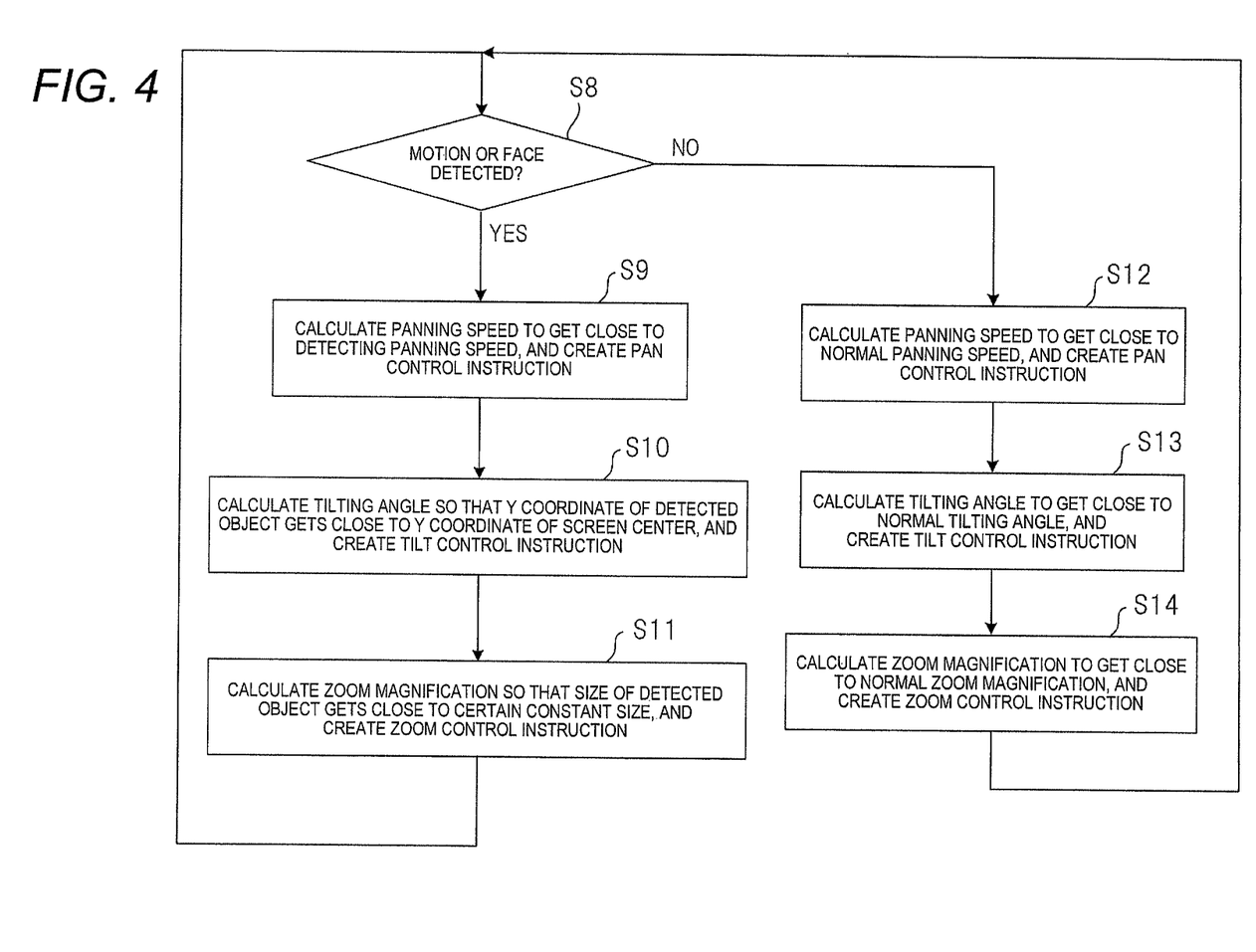
FIG. 4 is a flow diagram illustrating the operation of a video processing unit of a camera device with a rotary base according to a second embodiment of the invention.

FIG. 4 is a flow diagram illustrating the operation of the video processing unit 7B creating PTZ control instructions. In the drawing, it is first determined whether the motion and face detecting unit 71 detects the motion or face of an object based on a video signal from the imaging unit 4 (step S8). The process of step S9 is performed when it is determined that the motion or face of an object is detected, and the process of step S12 is performed when it is determined that the motion or face of an object is not detected.

When the motion or face of an object is detected and thus the process of step S9 is performed, the pan control instruction creating unit 72 calculates the panning speed so that the current panning speed gets close to the detecting panning speed, and creates and outputs a pan control instruction based on the calculation result (step S9).

After the pan control instruction is created and output, the tilt control instruction creating unit 73 calculates the operating tilting angle so that the Y coordinate of the detected object gets close to the Y coordinate of the screen center, and creates and outputs a tilt control instruction based on the calculation result (step S10).

After the tilt control instruction is created and output, the zoom control instruction creating unit 74 calculates the operating zoom magnification so that the size of the detected object on the display screen gets close to a certain constant size (for example, a quarter of the screen size), and creates and outputs a zoom control instruction based on the calculation result (step S11). At this time, the detected object is not fully seen from the display screen due to the zoom.

On the other hand, when the motion or face of an object is not detected and thus the process of step S12 is performed, the pan control instruction creating unit 72 calculates the panning speed so that the current panning speed gets close to the normal panning speed, and creates and outputs a pan control instruction based on the calculation result (step S12). After the pan control instruction is created and output, the tilt control instruction creating unit 73 calculates the tilting angle so that the current tilting angle input from the camera microcomputer 2 gets close to the normal tilting angle, and creates and outputs a tilt control instruction based on the calculation result (step S13). After the tilt control instruction is created and output, the zoom control instruction creating unit 74 calculates the zoom magnification so that the current zoom magnification input from the camera microcomputer 2 gets close to the normal zoom magnification, and creates and outputs a zoom control instruction based on the calculation result (step S14).

In this way, the panning speed, or the tilting angle, or the zoom magnification is not set to a target value at once, but is calculated to gradually get close to the target value.

Third Embodiment

A third embodiment of the invention provides a function of storing a trace in the previous cycle, tracking the trace, and returning the operation to the normal automatic panning operation in the next cycle when nothing is detected from the detection zone in the previous cycle. The configuration of this embodiment is the same as the first embodiment and FIG. 1 is incorporated herein by reference. However, a partial function of the video processing unit is different and thus the video processing unit is referenced by "7C".

Figure 5:
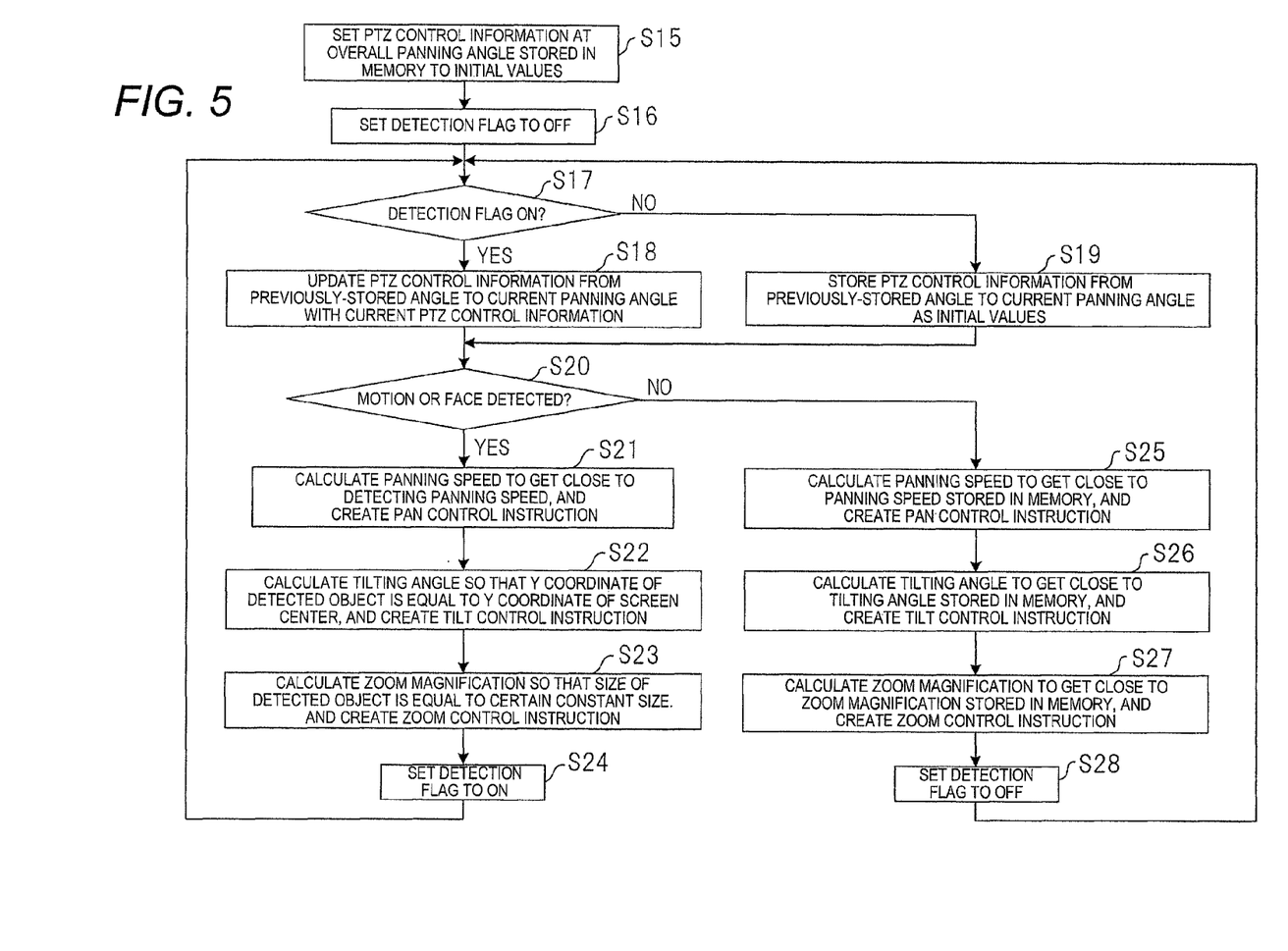
FIG. 5 is a flow diagram illustrating the operation of a video processing unit of a camera device with a rotary base according to a third embodiment of the invention.

FIG. 5 is a flow diagram illustrating the operation of the video processing unit 7C creating PTZ control instructions. In the drawing, first, the panning speed, the tilting angle, and the zoom magnification at the overall panning angle stored in the memory 75 of the video processing unit 7C are set to the normal panning speed, the normal tilting angle, and the normal zoom magnification (step S15). The interval of the panning angle stored in the memory 75 is about 1 degree. Then, a detection flag is set to OFF (step S16). It is determined whether the detection flag is set to ON (step S17). The process of step S18 is performed when it is determined that the detection flag is set to ON, and the process of step S19 is performed when it is determined that the detection flag is not set to ON (that is, the detection flag is set to OFF).

When the detection flag is set to ON and thus the process of step S18 is performed, the PTZ control information from the previously-stored angle to the current panning angle is updated with the current PTZ control information. On the contrary, when the detection flag is not set to ON and thus the process of step S19 is performed, the PTZ control information from the previously-stored angle to the current panning angle is stored as initial values.

After the process of step S18 or S19 is performed, it is determined whether the motion and face detecting unit 71 detects the motion or face of an object based on a video signal from the imaging unit 4 (step S20). The process of step S21 is performed when it is determined that the motion or face of an object is detected, and the process of step S25 is performed when it is determined that the motion or face of an object is not detected.

When the motion or face of an object is detected and thus the process of step S21 is performed, the pan control instruction creating unit 72 calculates the panning speed so that the current panning speed gets close to the detecting panning speed, and creates and outputs a pan control instruction based on the calculation result (step S21).

After the pan control instruction is created and output, the tilt control instruction creating unit 73 calculates the operating tilting angle so that the Y coordinate of the detected object gets close to the Y coordinate of the screen center, and creates and outputs a tilt control instruction based on the calculation result (step S22).

After the tilt control instruction is created and output, the zoom control instruction creating unit 74 calculates the operating zoom magnification so that the size of the detected object on the display screen gets close to a certain constant size (for example, a quarter of the screen size), and creates and outputs a zoom control instruction based on the calculation result (step S23). At this time, the detected object is not fully seen from the display screen due to the zoom. After the process of step S23 is performed, the detection flag is set to ON (step S24) and the process of step S17 is performed again.

On the other hand, when the motion or face of an object is not detected and thus the process of step S25 is performed, the pan control instruction creating unit 72 calculates the panning speed so that the current panning speed gets close to the panning speed at the current panning angle stored in the memory 75, and creates and outputs a pan control instruction based on the calculation result (step S25). After the pan control instruction is created and output, the tilt control instruction creating unit 73 calculates the operating tilting angle so that the current tilting angle gets close to the tilting angle at the current panning angle stored in the memory 75, and creates and outputs a tilt control instruction based on the calculation result (step S26). After the tilt control instruction is created and output, the zoom control instruction creating unit 74 calculates the operating zoom magnification so that the current zoom magnification gets close to the zoom magnification at the current panning angle stored in the memory 75, and creates and outputs a zoom control instruction based on the calculation result (step S27). After the process of step S27 is performed, the detection flag is set to OFF (step S28) and the process of step S17 is performed again.

Figure 6:
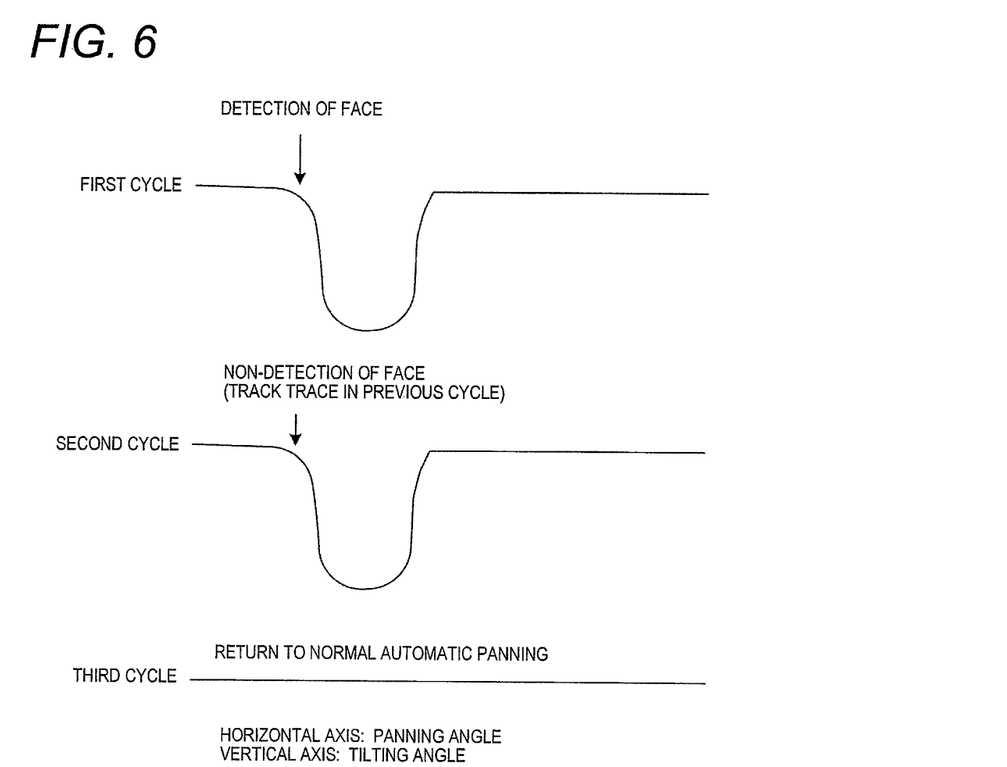
FIG. 6 is a diagram illustrating as images the operation of the camera device with a rotary base according to the third embodiment.

FIG. 6 is a diagram illustrating as images the operation in the third embodiment, where the horizontal axis represents the panning angle and the vertical axis represents the tilting angle. When a face is detected in the first cycle and a face is not detected in the second cycle, the same trace as in the first cycle is tracked but the operation is returned to the normal automatic panning in the third cycle. That is, the processes of steps S17, S18, and S20 to S24 are performed in the first cycle, the processes of steps S17, S18, S20, and S25 to S28 are performed in the second cycle, and the processes of steps S17, S18, and S19 are performed in the third cycle.

In this way, the trace in the previous cycle is stored, the same trace is tracked, and the operation is returned to the normal automatic panning operation for the detection zone in the next cycle when nothing is detected from the detection zone in the previous cycle. Instead of the same trace, the trace may be calculated in consideration of the moving distance of a detected object or the like.

While the invention has been in detail or with reference to specific embodiments, it is apparent to those skilled in the art that various changes or modifications can be added thereto without departing from the spirit and scope of the invention.

This application is based on Japanese Patent Application (Japanese Patent Application No. 2009-129089), filed May 28, 2009, contents of which are incorporated herein by reference.

INDUSTRIAL APPLICABILITY

The invention has an effect of achieving an automatic panning with a high efficiency which can image a zone centered on the location at which the motion or face of a subject is present, and is applicable to a monitoring system having a camera device with a rotary base.

DESCRIPTION OF REFERENCE SIGNS

1: CAMERA DEVICE WITH ROTARY BASE
2: CAMERA MICROCOMPUTER
3, 75: MEMORY
4: IMAGING UNIT
5: ROTARY BASE
6: SERVO MICROCOMPUTER AND MOTOR DRIVER
7, 7B, 7C: VIDEO PROCESSING UNIT
41: ZOOM LENS UNIT
42: IMAGING DEVICE
43: AGC AND A/D UNIT
51: PANNING MOTOR
52: TILTING MOTOR
71: MOTION AND FACE DETECTING UNIT
72: PAN CONTROL INSTRUCTION CREATING UNIT
73: TILT CONTROL INSTRUCTION CREATING UNIT
74: ZOOM CONTROL INSTRUCTION CREATING UNIT

The invention claimed is:

1. A camera device with a rotary base having an automatic panning function of performing an imaging operation in a predetermined panning direction at a first panning speed, said camera device comprising:
    an imager configured to image a subject and output a video signal;
    a rotary base configured to cause the imager to rotate in a panning direction and in a tilting direction;
    a motion and face detector configured to detect motion or a face of the subject within the image based on the video signal output from the imager;
    a tilt control instruction creator configured to create a tilt control instruction and to transmit the tilt control instruction to the rotary base to cause the imager to rotate in the tilting direction; and
    a pan control instruction creator configured to create a pan control instruction and to transmit the pan control instruction to the rotary base to control a speed at which the imager rotates in the panning direction,
    wherein, when the motion or face is not detected by the motion and face detector the imager is caused to rotate in the predetermined panning direction at the first panning speed; and
    when the motion or face is detected by the motion and face detector, the imager is caused to rotate in the predetermined panning direction at a second panning speed lower than the first panning speed until the motion or face is no longer detected by the motion and face detector, and
    wherein the predetermined panning direction is independent of a direction of movement of the motion or face of the subject within the image.

2. The camera device according to claim 1, further comprising:
    a zoom control instruction creator configured to create a zoom control instruction and to transmit the zoom control instruction to a zoom lens to magnify the subject,
    wherein, the zoom control instruction is transmitted to the zoom lens to magnify the subject based on the detection result from the motion and face detector.

3. The camera device according to claim 1,
    wherein the imager is caused to rotate in the tilting direction toward the motion or the face detected by the motion and face detector.

4. The camera device according to claim 1, further comprising:
    a zoom control instruction creator configured to create a zoom control instruction and transmit the zoom control instruction to a zoom lens to magnify the subject after the pan control instruction creator transmits the pan control instruction to the rotary base.

5. The camera device according to claim 1,
    wherein the pan control instruction creator controls the rotary base to change the first panning speed to approach the second panning speed.

6. The camera device according to claim 1,
    wherein the tilt control instruction creator controls a tilting angle so that the face or motion approaches a center of the subject.

7. The camera device according to claim 1,
    wherein when the motion or face is detected by the motion and face detector, the pan control instruction creator transmits the pan control instruction to the rotary base to control a speed at which the imager rotates in the panning direction at least twice.

8. The camera device according to claim 1,
    wherein when the motion or face is detected by the motion and face detector, the tilt control instruction creator transmits the tilt control instruction to the rotary base to cause the imager to rotate in the tilting direction at least twice.

9. The camera device according to claim 1, wherein the pan control instruction creator creates the pan control instruction and transmits the pan control instruction to the rotary base to control a speed at which the imager rotates in the panning direction upon each detection of the motion or face of the subject by the motion and face detector.

10. The camera device according to claim 1, further comprising a zoom control instruction creator that creates a zoom control instruction when the imager is rotating in the preset panning direction at the second panning speed.

11. The camera device according to claim 1, wherein, when the motion or face is detected by the motion and face detector, the tilt control instruction creator creates a tilt control instruction and transmits the tilt control instruction to the rotary base to cause the imager to move to a tilt angle at which a tilt direction coordinate of the detected subject is equal to a tilt direction coordinate of a center of a display of the camera device.

12. The camera device according to claim 11, wherein, when the motion or face is not detected by the motion and face detector, after having been detected, the tilt control instruction creator creates a tilt control instruction and transmits the tilt control instruction to the rotary base to cause the imager to move to an original tilt angle of the rotary base at which the imager was positioned prior to the detection of the motion or face.

13. A camera device with a rotary base having an automatic panning function of performing an imaging operation in a first direction at a first panning speed, said camera device comprising:
    an imager configured to image a subject and output a video signal;
    a rotary base configured to cause the imager to rotate in the first direction;
    a motion or face detector configured to detect a motion or face of the subject within the image based on the video signal output from the imager;
    a first controller configured to control a speed at which the rotary base rotates in the first direction,
    wherein when the motion or face of the subject is not detected by the motion or face detector, the imager is caused to rotate in the first direction at the first panning speed; and
    when the motion or face of the subject is detected by the motion or face detector, the imager is caused to rotate in the first direction at a second panning speed lower than the first panning speed until the motion or face is no longer detected by the motion or face detector, and
    wherein the first direction is independent of a direction of movement of the motion or face of the subject within the image.

14. The camera device according to claim 13, further comprising:
    a second controller configured to control the rotary base to rotate in a second direction which is substantially normal to the first direction.

15. The camera device according to claim 14, wherein the first controller controls the speed at which the rotary base rotates in the first direction upon each detection of the motion or face of the subject by the motion or face detector.

16. The camera device according to claim 14, wherein, when the motion or face of the subject is detected by the motion or face detector, the second controller controls the rotary base to cause the imager to move in the second direction such that a second direction coordinate of the detected object is equal to a second direction coordinate of a center of a display of the camera device.

17. The camera device according to claim 13, further comprising a zoom controller that causes a zoom lens of the camera device to perform a zooming operation when the imager is rotating in the first direction at the second panning speed.

18. A camera device with a rotary base having an automatic panning function of performing an imaging operation in a predetermined panning direction at a first panning speed, said camera device comprising:

- an imager configured to image a subject and output a video signal;
- a rotary base configured to cause the imager to rotate in a panning direction;
- a motion and face detector configured to detect motion or a face of the subject within the image based on the video signal output from the imager; and
- a pan control instruction creator configured to create a pan control instruction and to transmit the pan control instruction to the rotary base to control a speed at which the imager rotates in the panning direction, wherein, when the motion or face is not detected by the motion and face detector, the imager is caused to rotate in the predetermined panning direction at the first panning speed; and when the motion or face is detected by the motion and face detector, the imager is caused to rotate in the predetermined panning direction at a second panning speed lower than the first panning speed until the motion or face is no longer detected by the motion and face detector, and wherein the predetermined panning direction is independent of a direction of movement of the motion or face of the subject within the image.

\* \* \* \* \*